Dec. 7, 1954  D. K. JOVANOVICH  2,696,271
DAMPING MEANS FOR BLADES OF AIRCRAFT SUSTAINING ROTORS
Filed Nov. 5, 1951  2 Sheets-Sheet 1

DRAGOLJUB K. JOVANOVICH,
INVENTOR.

BY

ATTORNEY

Dec. 7, 1954 D. K. JOVANOVICH 2,696,271
DAMPING MEANS FOR BLADES OF AIRCRAFT SUSTAINING ROTORS
Filed Nov. 5, 1951 2 Sheets-Sheet 2
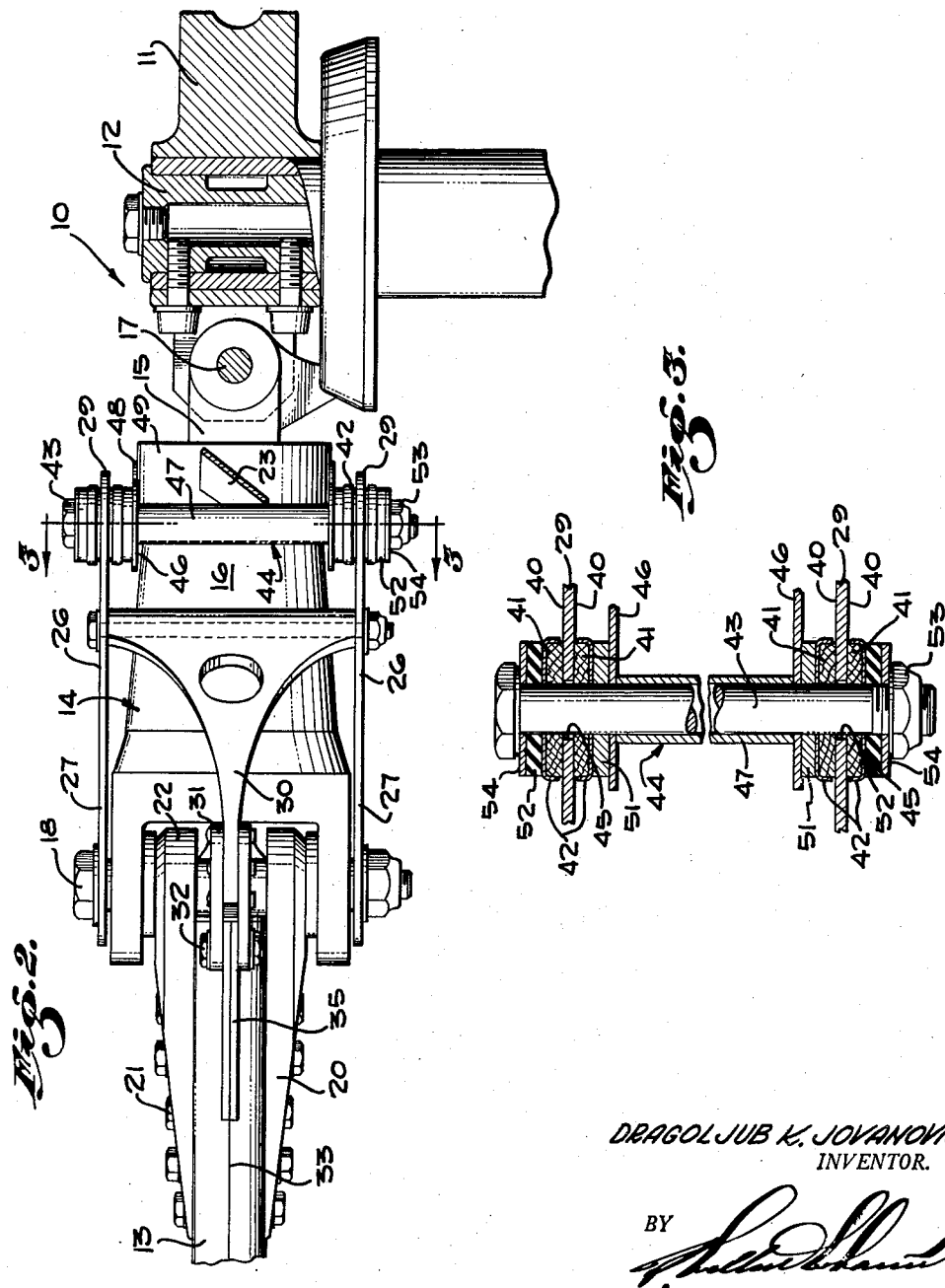
DRAGOLJUB K. JOVANOVICH,
INVENTOR.
BY
ATTORNEY

2,696,271

DAMPING MEANS FOR BLADES OF AIRCRAFT SUSTAINING ROTORS

Dragoljub K. Jovanovich, Redondo Beach, Calif., assignor to McCulloch Motors Corporation, Los Angeles, Calif., a corporation of Wisconsin Application November 5, 1951, Serial No. 254,863

3 Claims. (Cl. 170—160.55)

This invention relates in general to sustaining rotors for aircraft, and relates in particular to means for damping oscillation of the blades of aircraft sustaining rotors. In the normal operation of sustaining rotors, the rotor blades are subjected to a combination of forces, some of which set up oscillatory motion of the blades in a direction parallel to blade rotation. The rotor blades are connected to the rotor body by connecting means, each of which defines a radially extending line. As the rotor body revolves around its central axis these radial lines revolve around the central axis. The oscillatory motion of the blades referred to herein consists in movement of the blades relative to the radial lines forwardly and rearwardly with respect to the direction of movement of the lines and the blades around the axis of the rotor body. This oscillatory motion makes itself evident by an apparent jerky forward motion of the blades.

It is an object of the present invention to provide a simple and effective means for minimizing the oscillatory motion of the blades in a direction substantially parallel to the surfaces of rotation which the revolving blades define about the axis of the sustaining rotor.

It is an object of the invention to provide means for damping oscillatory motion of rotor blades comprising parts which slide one upon the other in frictional engagement, one of these parts being connected to the inner end of the blade and the other of the parts being connected to the means by which the blade is connected to the rotor body, these sliding parts having frictional engaging surfaces arranged to resist the sliding movement of the parts and thereby damp the oscillatory motion of the rotor blades.

It is a further object of the invention to provide a damping means for rotor blades of sustaining rotors comprising damper arms which project inwardly from the inner ends of the blades and across surfaces of the blade-rotor connecting means, these damper arms having friction members at the inner ends thereof which are engaged by friction parts supported by the connecting means to resist movement of the damper arms when swinging motion of the blades relatively to the connecting means imparts movement to the damper arms.

It is a further object of the invention to provide means for damping oscillatory motion of rotor blades which are connected to the rotor body by hinge pins disposed between the inner ends of the blades and the outer ends of the connecting means, there being damper arms arranged to extend from the upper and lower ends of the hinge pins and having connection with the inner ends of the blades so that oscillatory motion of the blades effects oscillatory motion of the damper arms, simple frictional devices being provided between the inner ends of the damper arms and the blade-rotor body connecting means for resisting motion of the damper arms by the blades which are tending to move in an oscillatory manner.

It is an object of the invention to provide rotor blade damping means of the character described in the foregoing having retarding means employing a simple rectilinear sliding action between parts of simple form which are readily adjustable to produce the desired retarding force.

Further objects and advantages of the invention will be brought out in the following part of the specification wherein small details of a preferred embodiment of the invention have been described for the purpose of completeness of disclosure without limiting the scope of the invention set forth in the accompanying claims or limiting the range of equivalents to which the elements of the claims may be entitled.

Referring to the drawings which are for illustrative purposes only:

Fig. 2 is an elevational view, to enlarge scale taken as indicated in line 2—2 of Fig. 1, and being partly sectioned so as to show selected details of the invention.

Fig. 3 is an enlarged fragmentary section taken as indicated by the line 3—3 of Fig. 2.

Figure 1:
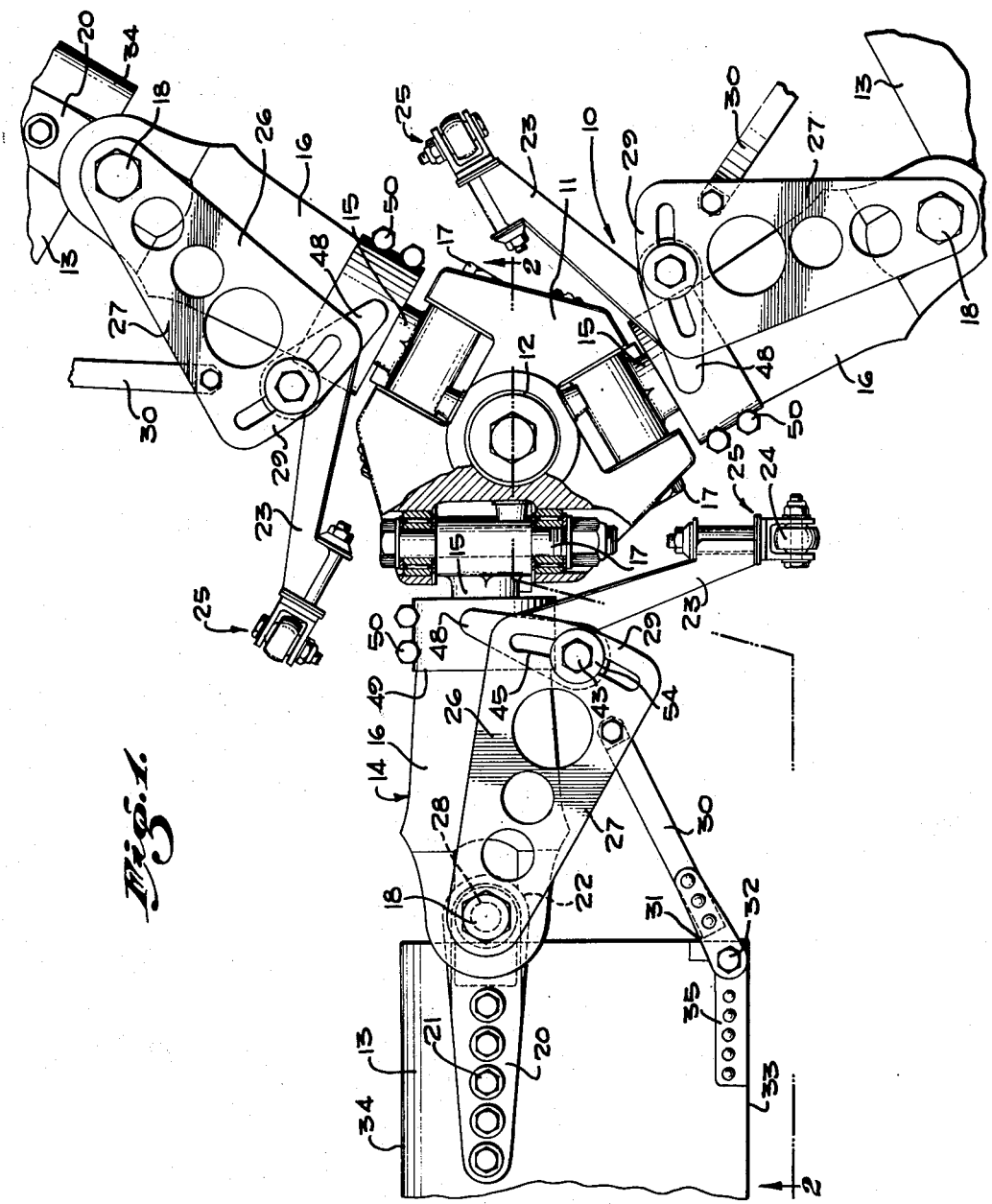
Fig. 1 is a plan view of significant portions of a sustaining rotor including a preferred embodiment of the invention.

The invention is embodied in a sustaining rotor 10 such as shown in Fig. 1, this rotor 10 including a hub or rotor body 11 which is fixed on the upper end of the shaft 12 and has a plurality of radiating rotor blades 13 connected thereto by connecting members 14, including inner and outer swivelled parts 15 and 16 respectively connected to the rotor body 11 and to the inner ends of the blades 13. The inner ends of the parts 15 are mounted on horizontal pins 17 carried by the rotor body 11 and the outer ends of the outer swivel parts 16 carry vertical hinge pins 18 forming parts of hinges which connect the inner ends of the arms 13 to the connecting members 14 so that the blades 13 may swing relatively to the connecting means 14 parallel to the direction of rotary travel of the blades when the sustaining rotor is in operation.

Referring to Figs. 1 and 2, each rotor blade 13 has upper and lower fittings 20 secured thereto by bolts 21, the inner ends 22 of the fittings 20 projecting from the inner end of the blade 13 and having openings through which intermediate portions of a hinge pin 18 may pass, thereby providing the desired articulation of the blade 13 upon the outer end of the connecting member. The blade 13 may swing up and down by reason of the fact that the inner end of the connecting member 14 is hinged upon a substantially horizontal pin 17, and the blade 13 may rotate on its longitudinal axis for pitch adjustment during operation since the outer swivel part 16 of the connecting member 14 is turnable on the axis established by the inner swivel part 15.

For rotation of its associated blade on the longitudinal axis thereof, for pitch control, each outer swivel part 16 is provided with a lever 23, the outer end of which is connected to a vertical link member 24 by means of the universal joint 25. The link 24 and the mechanism operating the same forms no part of the present invention which is directed to means for control of the swinging of the blade 13 on the associated hinge pin 18. Damper arms 26 are extended from the inner ends of each blade 13 toward the rotor body 11, above and below the swivel part 16 of the connecting member 14. These upper and lower damper arms 26 are identical in form and each consist of a flat plate 27, and respectively have openings 28 which receive the upper and lower end portions of the pin 18 projecting from the upper and lower faces of the outer swivel part 16. At the inner end of each damper arms 26 has thereon a friction member 29 which in the present embodiment of the invention consists of a portion of the plate 27 from which the damper arm 26 is formed.

The upper and lower damper arms 26 associated with each blade 13 are caused to swing with such blade 13 of the axis of the pin 18 by a link 30 having at its outer end a clevis 31 which is connected by a pin 32 to the inner end of the blade 13 at a point spaced from the hinge pin 18. Specifically, the pin 32 is positioned adjacent the trailing edge 33 of the blade 13, whereas, the pin 18 is disposed on or close to the longitudinal axis of the blade 13, near the leading edge 34 of the blade 13. Reenforcing plates 35 are riveted adjacent the trailing edge 33 on the upper and lower faces of the blade 13, and the pin 32 passes through these fittings 35 and also through the intervening portion of the blade 13.

The inner end of link 30 is expanded vertically so as to have upper and lower portions 35 and 36 which engage the walls 27 of the damper arms 26. The inner end of the link 30 has a vertical opening 37 to receive a bolt 38 which passes to openings 39 in the damper arms, to connect these damper arms 26 rigidly to the outer ends of the links or struts 30.

Each friction member 29 has upper and lower friction surfaces 40 arranged to be engaged by friction members 41 supported upon the connecting member 14 so that swinging of the blade 13 on the hinge pin 18 will produce relative movement of the first friction members 29 and the second friction members 41. The second friction members 41 comprise impregnated wood washers each of which is contained by a metal cup washer 42 which surrounds a portion of a bolt 43 which passes through a bracket 44 carried by the outer swivel part 16 and through arcuate openings 45 in the friction members 29.

The bracket 44 consists of upper and lower plates 46 and a spacer tube 47 extended between these plates 46 which have projecting portions 48 engaging and connected to a ring 49 which is clamped on the inner end of the outer swivel part 16 by clamping bolts 50. Spacer washers 51 are disposed around the bolt 43 between the plates 46 and the adjacent friction members 41. Resilient washers 52, which may be made of rubber, are arranged adjacent the outer faces of the outer-most friction members 41, so that when the nut 53 of the bolt 43 is tightened, washers 54 will compress the resilient washers 52 against the outer-most friction members 41, causing the friction members 29 and 41 to be pressed together with a pressure determined by the tightening of the nut. As oscillation of the blade 13 around the axis of the hinge pin 18 occurs, the respective friction members 29 will slide substantially horizontally between the friction members 41, and the oscillation of the blade 13 will be damped to an extent determined by the frictional reaction of the friction members 41 on the friction members 29.

I claim:

1. In combination with a rotor body, means for connecting and controlling movement of a blade of a sustaining rotor: a connecting member having its inner portion connected to said rotor body; a hinge having an upright hinge pin connecting the inner end of said blade to the outer portion of said connecting member whereby the blade may swing horizontally with relation to said connecting member; a damper arm mounted on said pin and extending along said connecting member; a link connecting said damper arm to said blade at a point near the trailing edge thereof so as to cause said arm to swing with said blade around the axis of said hinge pin; and a friction means mounted on said connecting member in a position to frictionally engage said arm and effect a damper action which is transmitted through said damper arm and said link to said blade.

2. In combination with a rotor body, means for connecting and controlling movement of a blade of a sustaining rotor: a connecting member having its inner portion connected to said rotor body; a hinge having an upright hinge pin connecting the inner end of said blade to the outer portion of said connecting member whereby the blade may swing horizontally with relation to said connecting member; upper and lower damper arms mounted on the upper and lower ends of said pin and extending along said connecting member; link means connecting said damper arms to said blade so as to cause said arms to swing with said blade around the axis of said hinge pin, said arms having first friction members thereon; and second friction members mounted on said connecting member and having friction surfaces positioned for engagement with said friction members of said arms to damp the movement of said arms and said blade.

3. In combination with a rotor body, means for connecting and controlling movement of a blade of a sustaining rotor: a connecting member having its inner portion connected to said rotor body; a hinge connecting the outer portion of said connecting member to the inner portion of said blade so that said blade may swing relatively to said connecting member; a damper member hingedly connected to and extending from the inner end of said blade and being connected to said blade so as to be swung transversely of said connecting member as said blade swings on said hinge, said damper member having a first friction member with a friction surface; link means connecting said damper member to said blade at a point spaced from the outer end of said damper member; and a second friction member having a friction surface and being secured to said connecting member in such position that its friction surface will engage the friction surface of said first friction member and slide relatively thereto as said damper member moves relatively to said connecting member.

References Cited in the file of this patent

UNITED STATES PATENTS

| Number | Name | Date |
|---|---|---|
| 2,114,808 | Pitcairn | Apr. 19, 1938 |
| 2,155,427 | Larsen | Apr. 25, 1939 |
| 2,494,985 | Campbell | Jan. 17, 1950 |